July 13, 1943.  R. H. SHEPPARD  2,324,328
COMBUSTION CHAMBER
Filed Nov. 1, 1941

Inventor
Richard H. Sheppard,
By Henry H. Snelling
Attorney

Patented July 13, 1943

2,324,328

UNITED STATES PATENT OFFICE 2,324,328

COMBUSTION CHAMBER

Richard H. Sheppard, Hanover, Pa.

Application November 1, 1941, Serial No. 417,532

5 Claims. (Cl. 123—32)

This invention relates to Diesel engines, and has for its general object the provision of an improved combustion chamber having more efficient turbulence during the injection period.

The primary object of my invention is to provide an arrangement of combustion chamber and cylinder which reduces the amount of solid fuel impinging against the enclosing surfaces thereby improving the combustion by reducing smoldering and resulting carbon deposit. Smoldering, indicated by smoky combustion, is chiefly due to lack of air, at the point of contact with the surfaces, and therefore by increasing the ratio of air to the portion of solid fuel touching the hot surfaces I reduce the smoldering and without changing the ratio of total air to total fuel charge.

A second object of this invention is to increase the power while decreasing the exhaust smoke by adding a third and smaller throat working in opposition to the other two throats. This provides further turbulence in the combustion chamber and more important it prevents fuel from the injector from being swept on to the combustion chamber wall by the main swirl provided by the two large throats.

A third object of the invention is to eliminate or greatly reduce the tremendous pressure exerted by a tightly fitting block tending to force apart the head and block with attendant loss of pressure. This is accomplished by making a portion of the chamber non-rigid so it may compress at operating temperature and expand to full length when cooler.

A specific object is to provide a combustion chamber arrangement whereby a portion of the fuel charge and particularly the larger droplets of fuel occuring at full load are directed into the upper central portion of the cylinder. A further specific object is to provide a combustion chamber in which the fuel charge is insulated from the surface by a layer of revolving air which is turbulent on its descending side.

A still further specific object is to form in the chamber block an outside annular groove and an inside annular groove so that the chamber block or plug may be made exactly the same length as the hole into which it fits, thereby avoiding the building up of carbon deposits as occurs if the block is a few thousandths short to allow for expansion at extreme temperatures.

An important object is to provide a combustion chamber plug to be substituted in existing engines having spherical or cylindrical combustion chambers to increase the efficiency of such engines.

Figure 1:
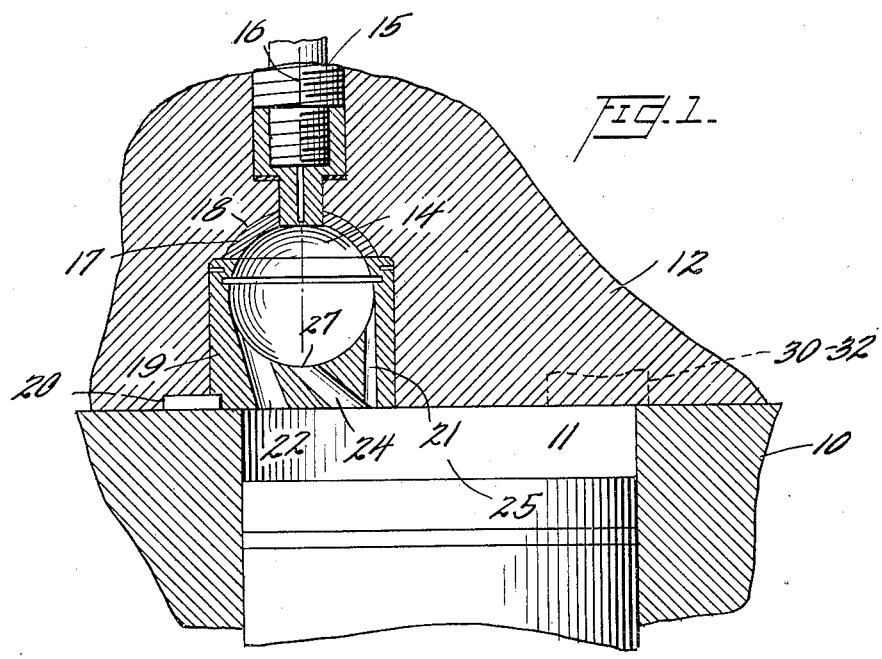
Figure 1 is a vertical sectional view of the upper part of an engine showing the cylinder and combustion chamber.

In Figure 1 the engine block 10 is shown as having a cylinder 11 and cylinder head 12, with a combustion chamber 14 located in the head 12. The combustion chamber is preferably of spherical shape and has at the top a fuel injection nozzle 15 which is adapted to inject a jet of fuel having its axis 16 approximately in the vertical diameter of the chamber.

Figure 2:
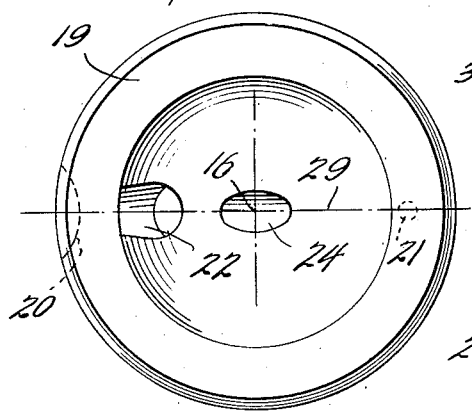
Figure 2 is an enlarged top plan view of the chamber plug.

The upper part of the combustion chamber is formed by the hemispherical termination 17 of the bore 18 in the cylinder head 12 and the lower part is a complementary cavity in the upper face of what may be termed a throat block or plug 19 fitting in the bore and in which it is held by its bottom face being engaged by the top of the cylinder block; a screw 20 on the edge of the plug, as best shown in Figure 2, prevents rotation of the plug from its preferred angular position. Although a spherical chamber is preferred I find that a chamber having circular cross section in planes parallel to the axis of the cylinder is also satisfactory.

Figure 3:
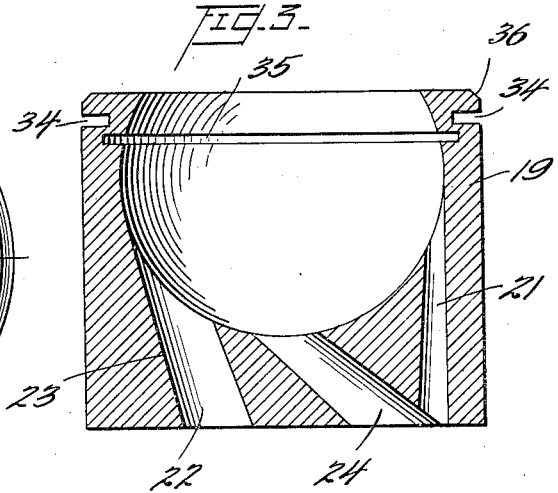
Figure 3 is a central section through Figure 2.

The throat block or plug 19 is provided, in addition to the new third throat 21, with a main throat 22 and an auxiliary throat 24, the outer wall 23 of the main throat being tangential to the surface of the chamber whereby air rushing through will rotate in the chamber about its axis which in the drawing is a horizontal axis. The auxiliary throat 24 is at a slight angle to the tangent of the chamber wall and is positioned to direct the outgoing charge toward the center 25 of the upper part of the cylinder and has its orifice 27 located to receive droplets from the injector nozzle 15, that is, the axis of the fuel jet passes through the orifice 27. The throat 24 is positioned to produce a layer of air within the layer of air created by the air rushing through the main throat 22 into the chamber. Whether the combustion chamber is spherical or is cylindrical in shape the throat block is positioned for best results with the axis of the throat 24 in a radial plane of the cylinder and the third throat 21 and main throat 22 are preferably but not necessarily located with their axes in the same plane whereby the fuel charge is directed toward the center of the cylinder. As shown in Figures 1 and 3, the axis of the third throat is vertical, the main throat lies at an angle of 72° and that of the second or auxiliary throat is less steep, lying at an angle of 40°.

The main and auxiliary throats discharge air from the cylinder into the combustion chamber to revolve in the same direction but the smaller third throat opposes this motion and creates turbulence on the right or descending side of the outer air layer.

Under full load, a large percentage of the fuel reaches the opposite side of the combustion chamber and enters the throat 24 without being atomized, so that the out-rushing fuel charge carries, or at least starts, these relatively large droplets directly toward the center of the cylinder, thus producing efficient combustion by reducing to a minimum the amount of solid fuel contacting the enclosing walls. The throat 24 is preferably positioned so that its axis intersects the cylinder axis 25 at a point spaced from the cylinder head a distance not much greater than the length of the throat. The third throat, by opposing deflection of these droplets from the entry end of the second throat, materially aids in the desired avoidance of color in the exhaust discharge.

In the plan view, Figure 2 showing the preferred relative position of the parts, it will be seen that the vertical plane 29 containing the vertical axis 16 of the combustion chamber bisects all three throats and lies between the exhaust valve 30 and the intake valve 32. The chamber with only the main and auxiliary throats is an excellent design but the third throat 21 increases the power and provides a more efficient and quiet combustion as indicated by the decrease in exhaust smoke, which at ordinary loads is substantially invisible, if not actually so.

The grooves 34 and 35 with the slight bevel 36 permit the making of the plug or block of the exact length of the bore 18 which receives it. When a block is made shorter than the length of the bore, the remedy is only a temporary one, because of the building up of carbon deposits, during the starting process, which soon fill the space. By means of the slot or groove 34 cut inward from the outside of the block and the adjacent slot or groove 35 in the combustion chamber itself the block loses its absolute rigidity and may compress in length a few thousandths of an inch without damage to itself or exerting damaging pressure to separate the body and head. Without these grooves the combustion chamber plug, being hotter than the head which surrounds it, expanded a greater amount tending to force apart the cylinder block and its head so that there might be a loss of gases with consequent loss of power. It is important to note that the deformation is temporary as although the compression changes the length of the combustion chamber plug is constant so it is tight in the head when cooled as when the engine is in operation.

The high efficiency of combustion obtained by my engine under all loads is believed to be due to the fact that a minimum of solid fuel touches the hot enclosing surfaces and this for two reasons: first, the air entering the combustion chamber through the throat 22 during compression forms an insulating layer of air between the surface of the chamber and the atomized fuel from the fuel nozzle and the main fuel charge is contained mainly in an inner layer formed by the air entering the chamber through the throat 24, and, second, under full load at which time the fuel feed is maximum, the droplets injected pierce both blankets of rotating air by aid of the turbulence caused by the third throat without being completely atomized and enter the orifice 27 of the throat 24, so that as combustion takes place these relatively large droplets are directed toward the center of the cylinder 11. The rarer portion of the fuel charge is directed by throat 22 into the outer region of the cylinder near the top wall. Thus, we have a combustion charge in the cylinder having a rich center and a rarer outer portion which is contrary to the accepted theory that the mixture of air and fuel should be uniform for maximum efficiency. The efficiency theoretically lost due to the non-uniform mixture of the fuel charge is compensated for by the substantial elimination of improper surface contact burning.

Other theories have been advanced to explain the high efficiency I have obtained but the one given seems to satisfy the different factors present. It is understood, of course, that the layers of air are by no means distinct but it is believed that the layer produced by the throat 22 does prevent a considerable portion of the solid fuel from contacting the chamber surface and the small amount touching the walls has sufficient air to support combustion without smoldering. It is also to be understood that the mixture of air and fuel enveloped in the layer of insulating air in the chamber becomes substantially uniform before ignition and that the richer mixture in the throat 24 is chiefly due to the presence of the larger droplets, at full load, injected directly into the throat.

What I claim is:

1. A throat block for an internal combustion engine of the compression ignition type including a cylinder block having a cylinder bore and a cylinder head having a cavity therein shaped at one end with a partial surface of revolution, said throat block fitting in said cavity and having a complementary partial surface of revolution registering with the first mentioned surface to form a combustion chamber, and a plurality of throats leading from said combustion chamber to the cylinder bore, said throat block having a relief groove in its cylindrical periphery opening toward the wall of the cylinder head and having a second annular groove open to said combustion chamber whereby as the heated gases rush through the throats to the cylinder bore, said relief recesses will permit the throat block to increase in temperature without increase in length when secured at its opposite ends by the cylinder block and the cylinder head.

2. An insert element for a Diesel engine consisting of a one-piece body having: a fuel receiving chamber therein, two end surfaces adapted to engage the engine block and the cylinder head respectively whereby expansion by the body when heated tends to force the head and block apart, and a relief groove generally parallel to the plane of engagement of the engine block and cylinder head; such construction permitting the body to be made exactly the same length as the hole into which it fits so as to avoid the building up of carbon deposits which occurs if allowance for expansion is made.

3. The device of claim 2 in which the relief groove is annular and opens to the chamber.

4. The device of claim 2, in which the relief groove is annular and opens to the wall of the cavity in the cylinder head.

5. The device of claim 2 in which there are two relief grooves, one opening into the chamber and the other opening to the side wall of the cylinder head.

RICHARD H. SHEPPARD.